United States Patent
Goswami et al.

(10) Patent No.: US 8,850,429 B2
(45) Date of Patent: Sep. 30, 2014

(54) LOAD BALANCING IN MULTI-SERVER VIRTUAL WORKPLACE ENVIRONMENTS

(75) Inventors: Kumar Goswami, Sunnyvale, CA (US); Michael Peercy, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 147 days.

(21) Appl. No.: 13/253,426

(22) Filed: Oct. 5, 2011

(65) Prior Publication Data
US 2012/0096461 A1    Apr. 19, 2012

Related U.S. Application Data

(60) Provisional application No. 61/390,127, filed on Oct. 5, 2010.

(51) Int. Cl.
*G06F 9/455* (2006.01)
*G06F 9/50* (2006.01)

(52) U.S. Cl.
CPC .... G06F 9/45558 (2013.01); *G06F 2009/4557* (2013.01); G06F 9/5088 (2013.01)
USPC .......................................................... 718/1

(58) Field of Classification Search
CPC ..... G06F 3/067; G06F 3/0631; G06F 3/0647; G06F 9/5072
See application file for complete search history.

(56) References Cited

U.S. PATENT DOCUMENTS

| | | | |
|---|---|---|---|
| 8,261,268 B1* | 9/2012 | Forgette | 718/1 |
| 2007/0028239 A1* | 2/2007 | Dyck et al. | 718/1 |
| 2007/0162914 A1* | 7/2007 | Deen et al. | 719/330 |
| 2007/0204266 A1* | 8/2007 | Beaty et al. | 718/1 |
| 2008/0043622 A1* | 2/2008 | Kamath et al. | 370/235 |
| 2010/0070978 A1* | 3/2010 | Chawla et al. | 718/105 |
| 2010/0138827 A1* | 6/2010 | Frank et al. | 718/1 |
| 2012/0036515 A1* | 2/2012 | Heim | 718/105 |
| 2012/0059934 A1* | 3/2012 | Rafiq et al. | 709/225 |

OTHER PUBLICATIONS

"Nebulas Solutions Launches 'VDI in a Box' to Cut the Cost, Time and Complexity of Deploying Virtual Desktop Infrastructures" 2 pages.

* cited by examiner

*Primary Examiner* — Emerson Puente
*Assistant Examiner* — Dong Kim
(74) *Attorney, Agent, or Firm* — Banner & Witcoff, Ltd.

(57) ABSTRACT

Virtual workplace server software may perform load balancing functionality in a multi-server desktop virtualization system. One or more virtualization servers may receive and maintain common state information for the desktop virtualization system, and may independently execute one or more load balancing functions based on the common state information. Each server may independently analyze the common state information and determine whether it will execute a load balancing function based on the analysis, thereby allowing the servers to coordinate actions using distributed load balancing algorithms.

24 Claims, 11 Drawing Sheets

LOAD BALANCING IN MULTI-SERVER VIRTUAL WORKPLACE ENVIRONMENTS

RELATED APPLICATIONS

The present application is a non-provisional of U.S. Patent Application No. 61/390,127, entitled "A Shared-Nothing Highly Available and Scalable Distributed Virtual Desktop System and Method," filed Oct. 5, 2010, the contents of which are incorporated herein by reference in their entirety for all purposes.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, desktop virtualization servers may include one or more virtual machine managers (e.g., hypervisors) to allow multiple different operating systems, tasks, and/or software configurations to exist on the same physical machine. For instance, a VDI server may include a hypervisor to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. Multi-server desktop virtualization systems often include additional computing devices and/or shared storage to provide a common system management portal and to maintain global state information. Such systems often use the external shared storage, along with database and enterprise server software within the virtualization servers, to manage the system.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to certain aspects, a server executing desktop virtualization software may perform load balancing functionality in a multi-server desktop virtualization system. A virtualization server may receive and maintain common state information for the desktop virtualization system, and may execute one or more load balancing functions and algorithms based on the common state information. For example, the server may analyze the state information to determine a load balancing action and one or more target servers to perform the action. Then, the server may determine if it itself is one of the target servers, and if so, it may perform the load balancing action. According to additional aspects, the same or similar desktop virtualization software may be executed at multiple servers in the system, each locally maintaining common system state information. Thus, each server may independently determine and execute a course of action based on the common system state, thereby allowing the servers to coordinate actions using distributed load balancing algorithms.

According to other aspects, the distributed load balancing algorithms performed at the servers in a multi-server desktop virtualization system may include, for example, static load balancing, dynamic load balancing, and connection load balancing. Using these load balancing techniques, the servers in the desktop virtualization system may independently execute functions to manage the distribution of stored virtual machine base images, allocated virtual machines, and hosted virtual desktops among the servers in the system. According to additional aspects, the load balancing techniques and functions described herein may be performed by desktop virtualization software, rather than solely by the operating system, enterprise server software and/or other specialized software within the virtualization servers.

BRIEF DESCRIPTION OF THE DRAWINGS

Figure 1:
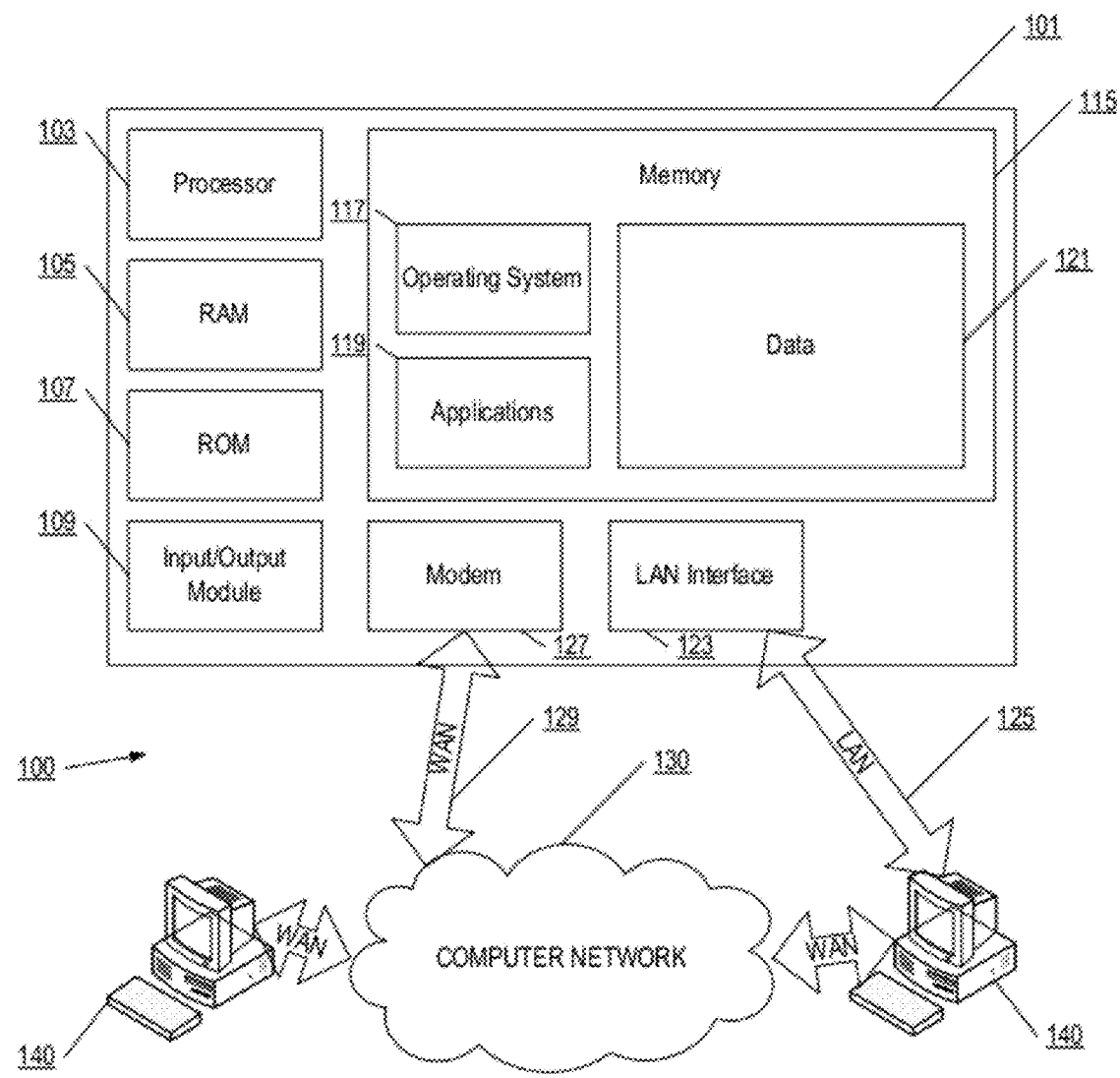

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
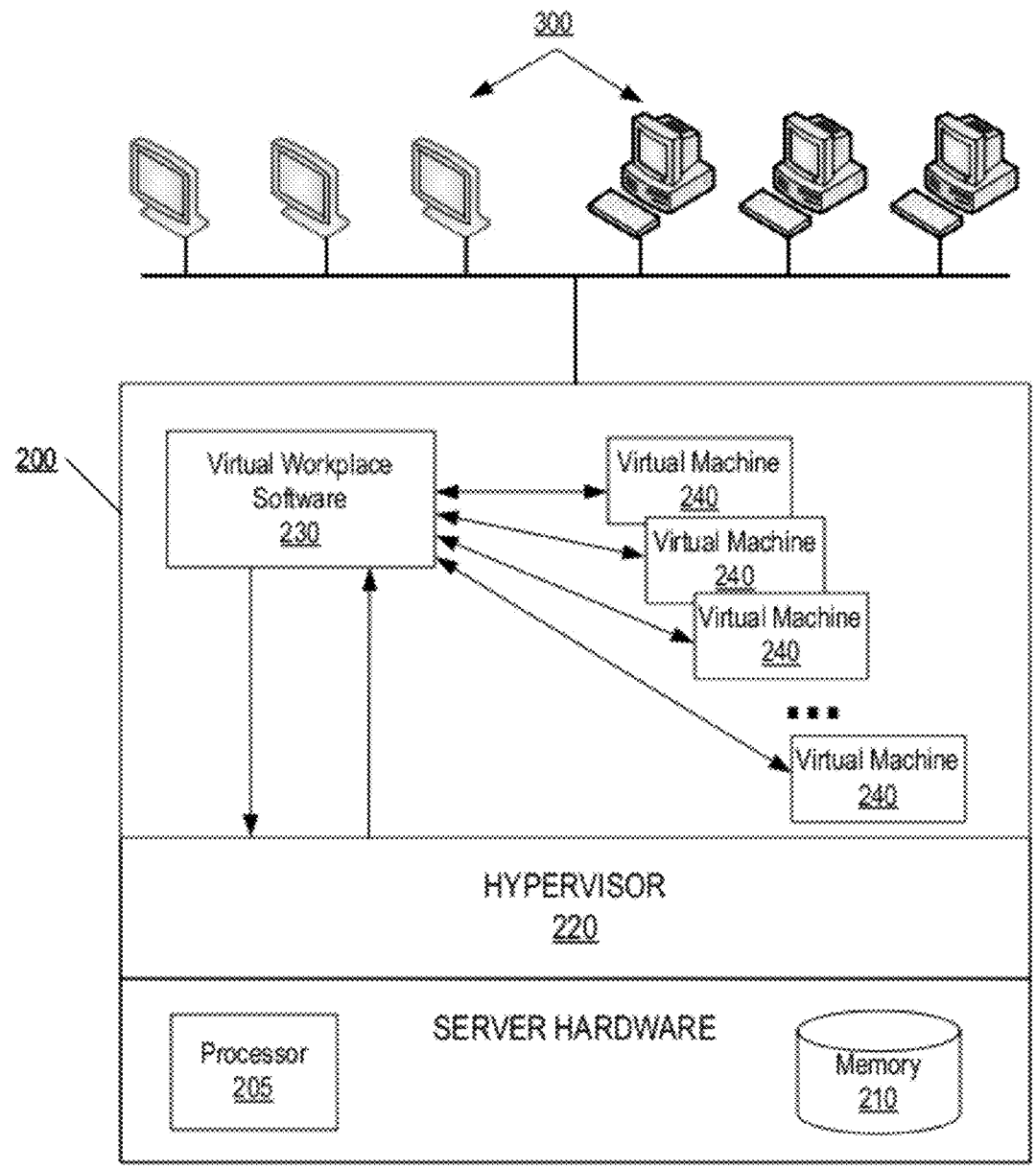

FIG. 2 is a high-level architecture diagram of a desktop virtualization system in accordance with one or more illustrative aspects described herein.

Figure 3:
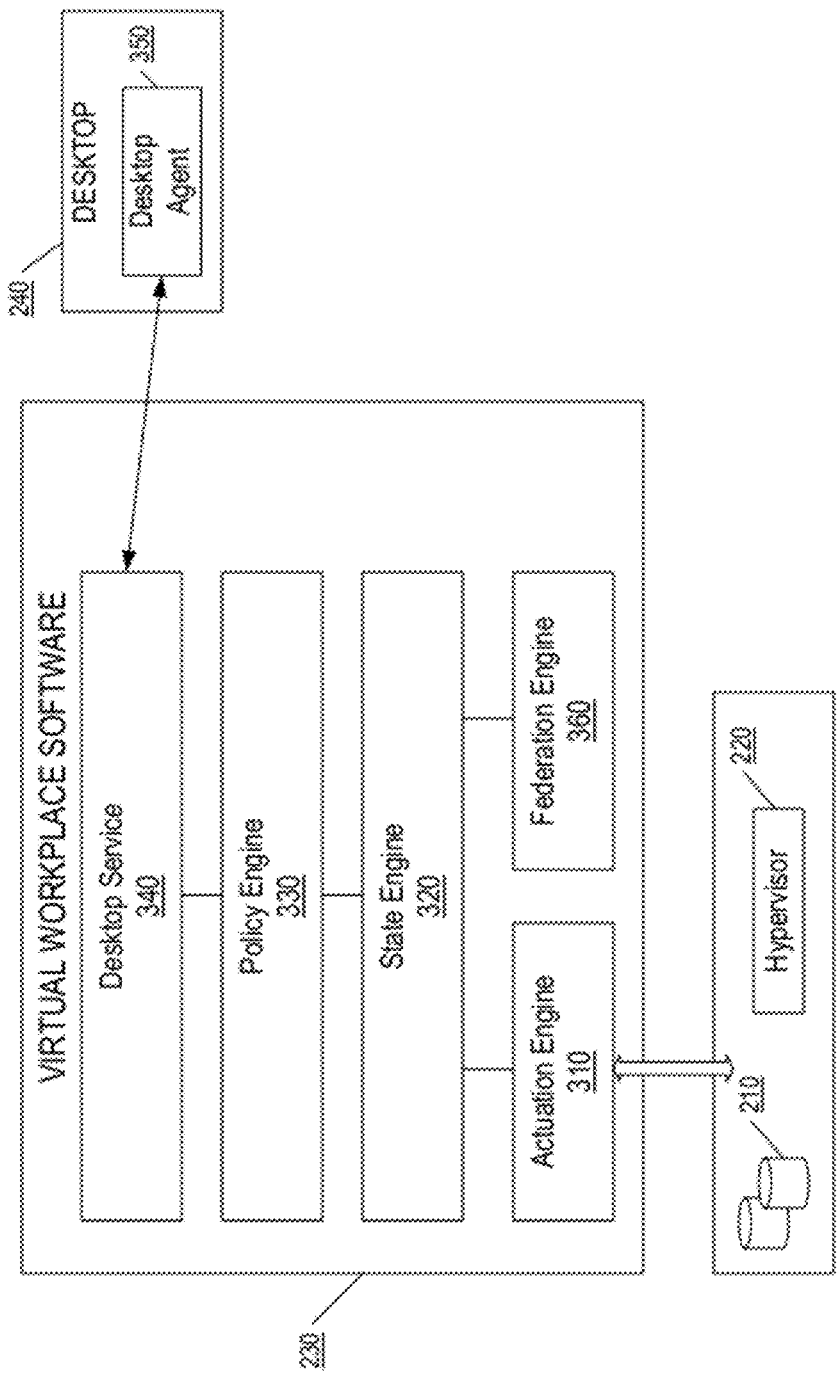

FIG. 3 is a functional component diagram illustrating a desktop virtualization system in accordance with one or more illustrative aspects described herein.

Figure 4:
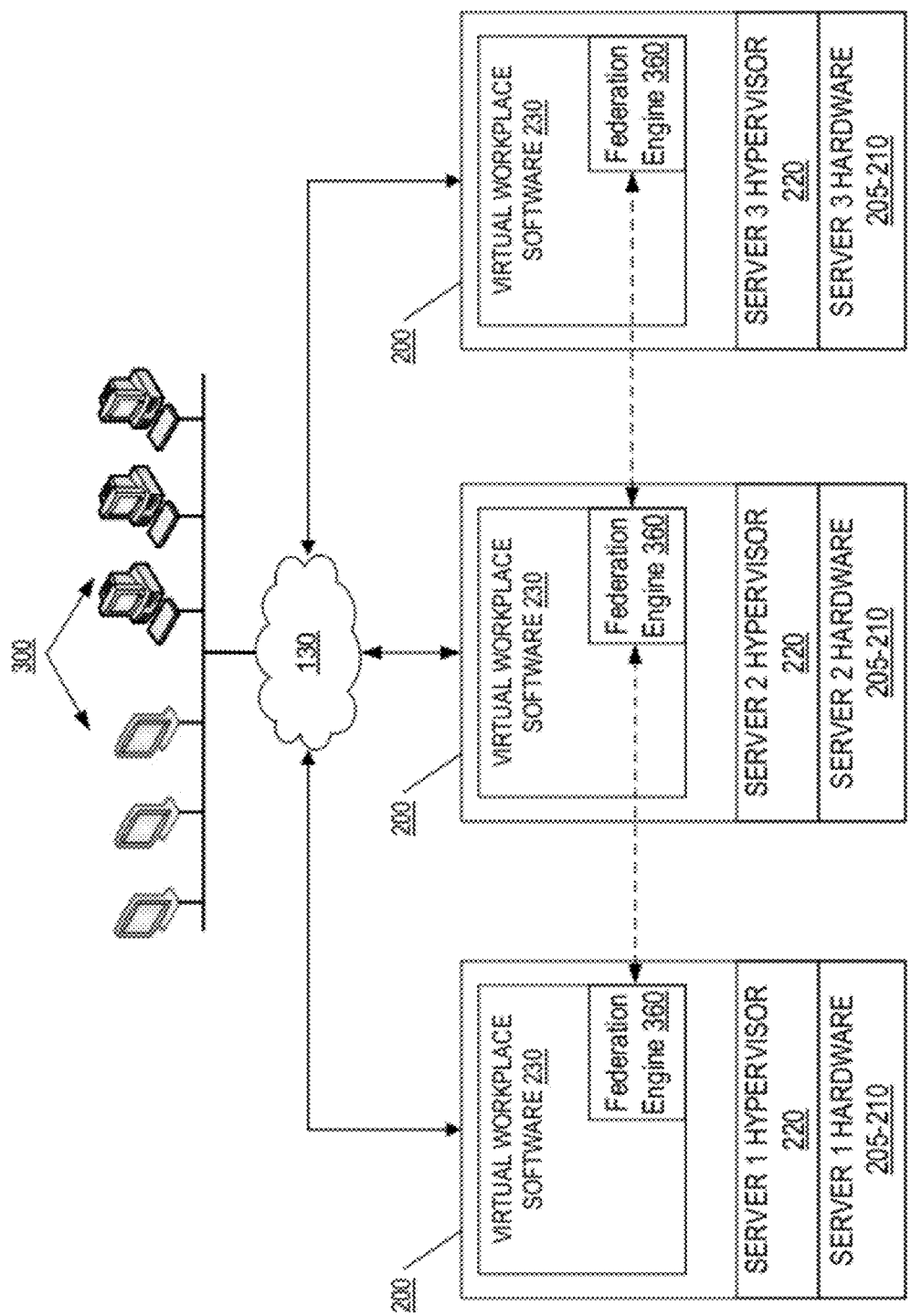

FIG. 4 is a high-level architecture diagram of a multi-server desktop virtualization system in accordance with one or more illustrative aspects described herein.

Figure 5:
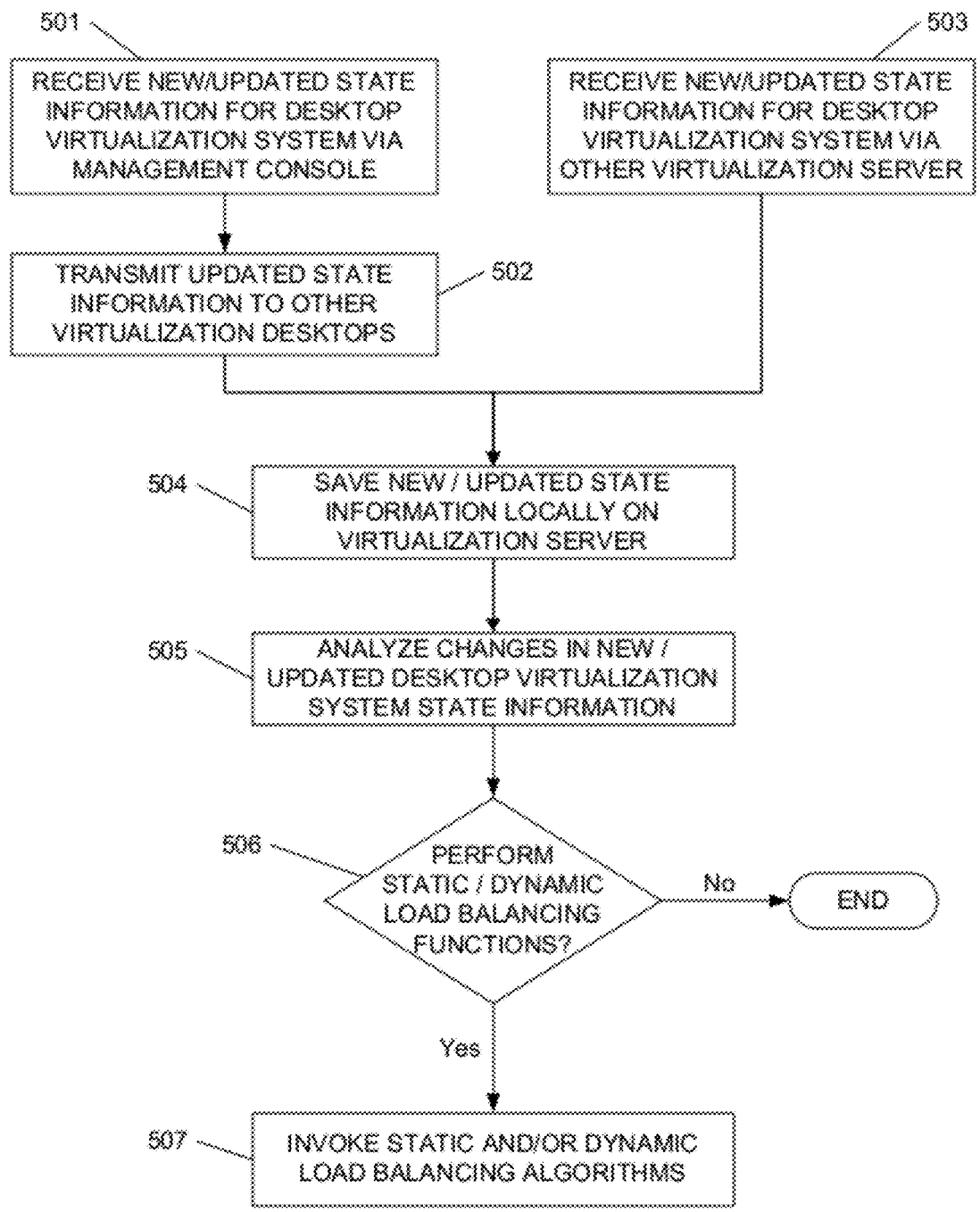

FIG. 5 is a flow diagram illustrating a method of performing load balancing in a desktop virtualization system in accordance with one or more illustrative aspects described herein.

Figure 6:
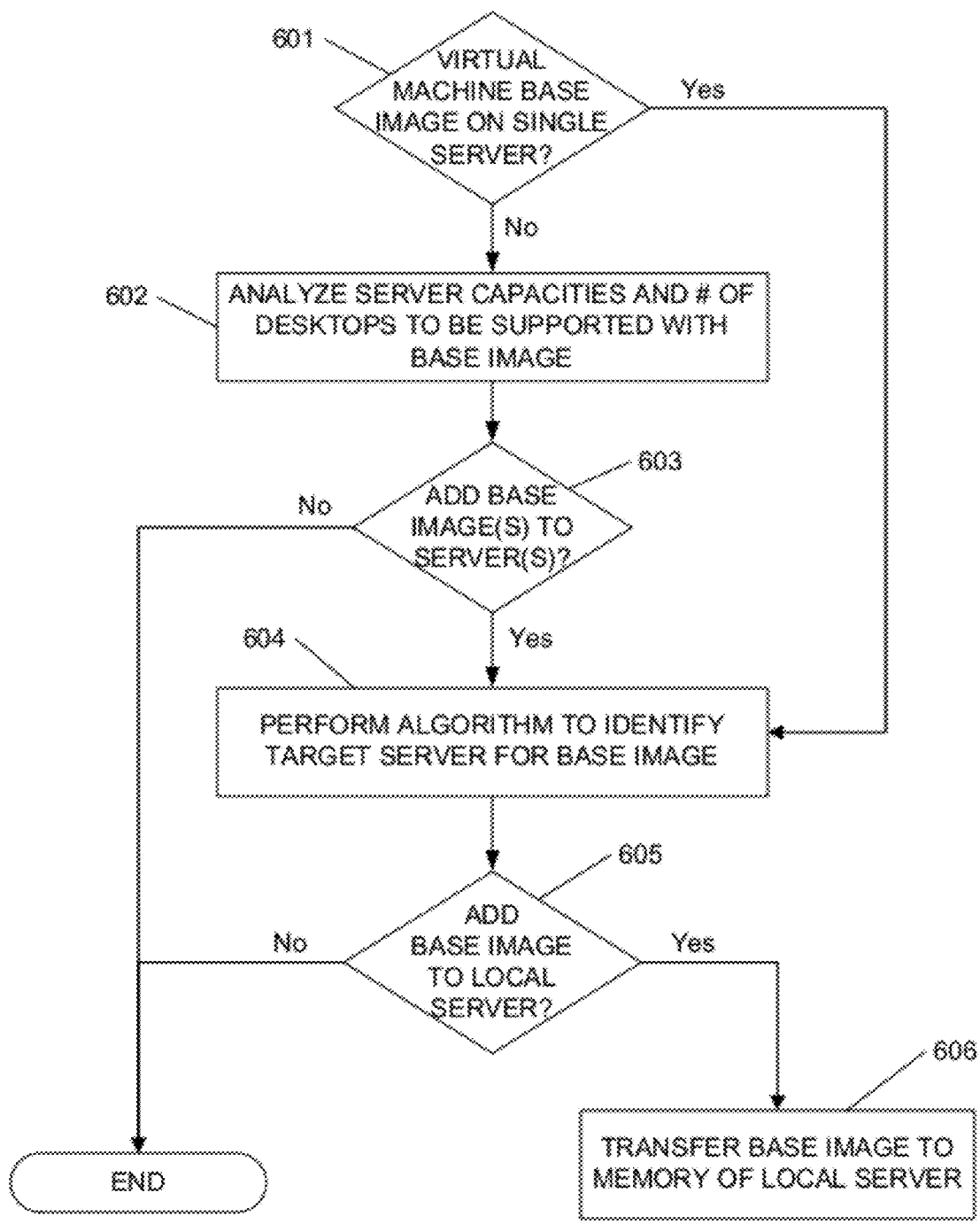

FIG. 6 is a flow diagram illustrating a method of performing static load balancing on a desktop virtualization server in accordance with one or more illustrative aspects described herein.

Figure 7:
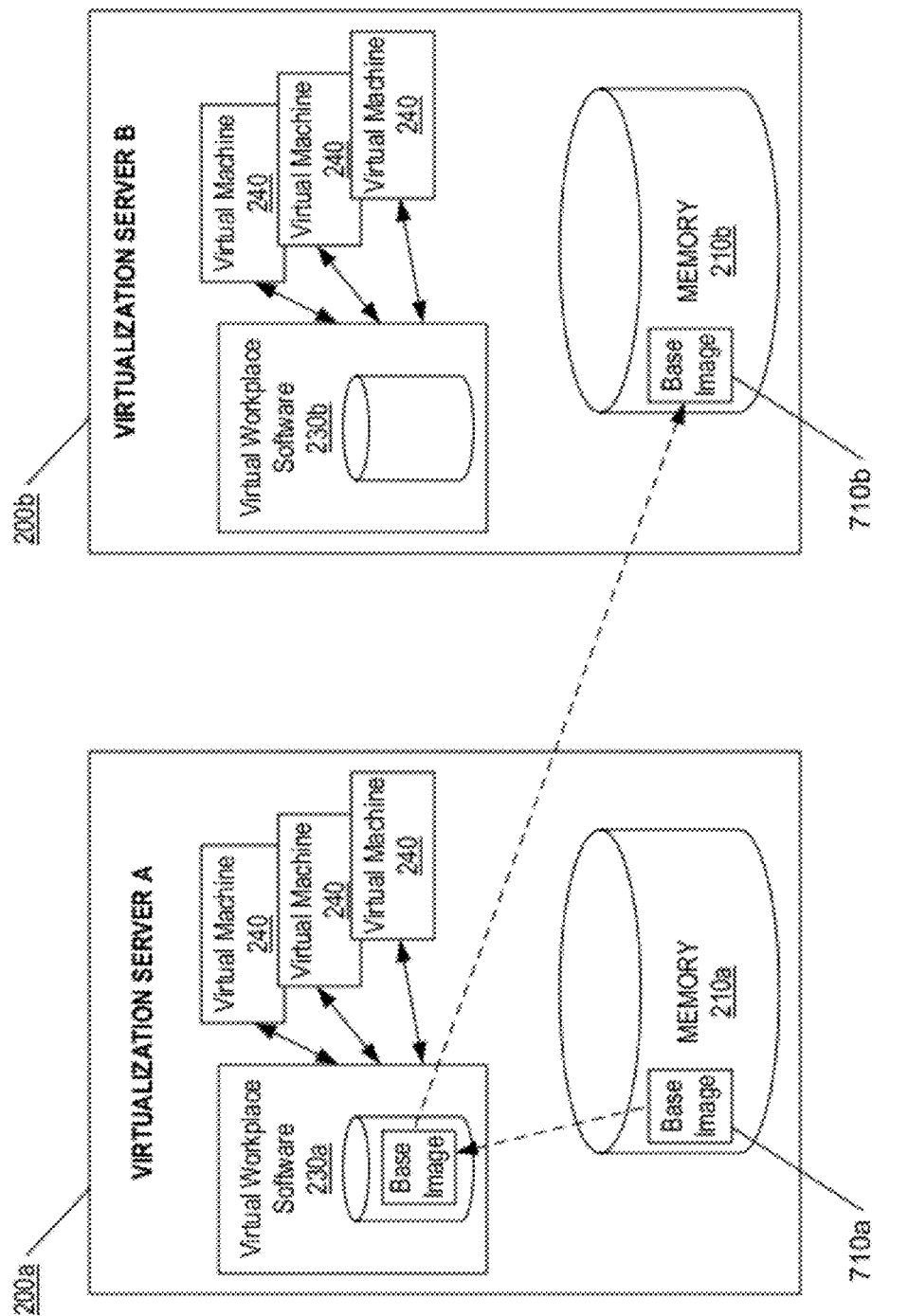

FIG. 7 is a component diagram illustrating a technique of transferring a virtual machine base image between servers in a multi-server desktop virtualization system in accordance with one or more illustrative aspects described herein.

Figure 8:
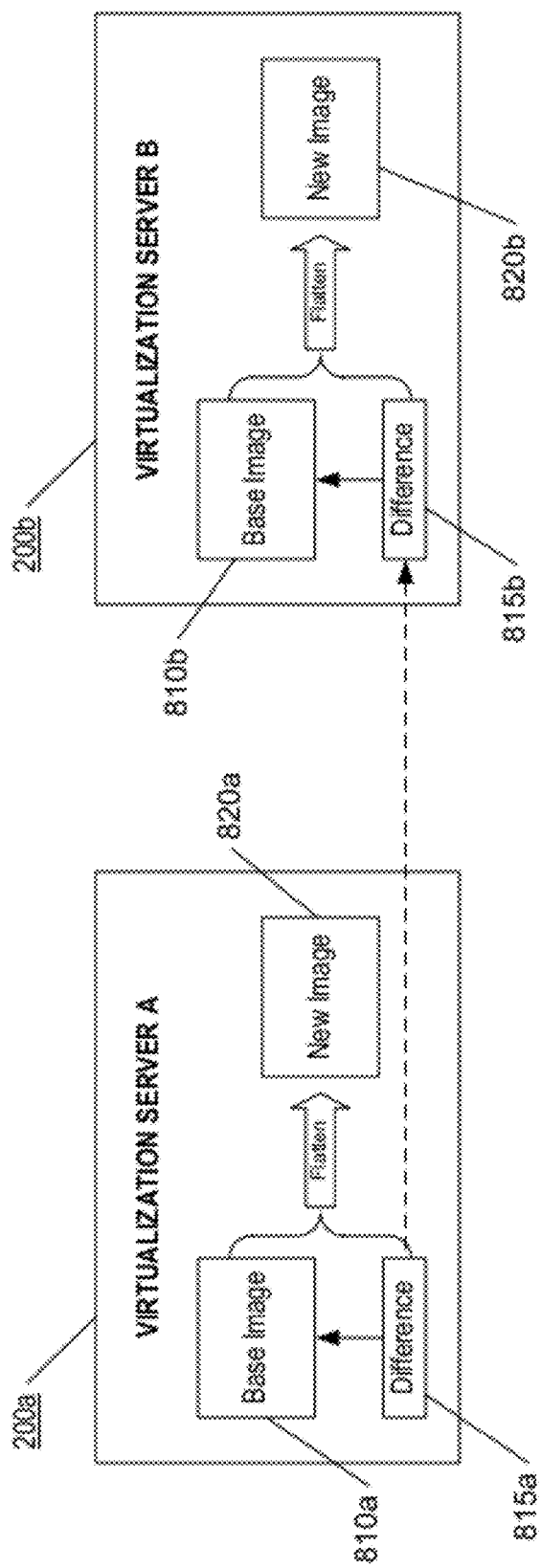

FIG. 8 is a component diagram illustrating another technique of transferring an virtual machine base image between servers in a multi-server desktop virtualization system in accordance with one or more illustrative aspects described herein.

Figure 9:
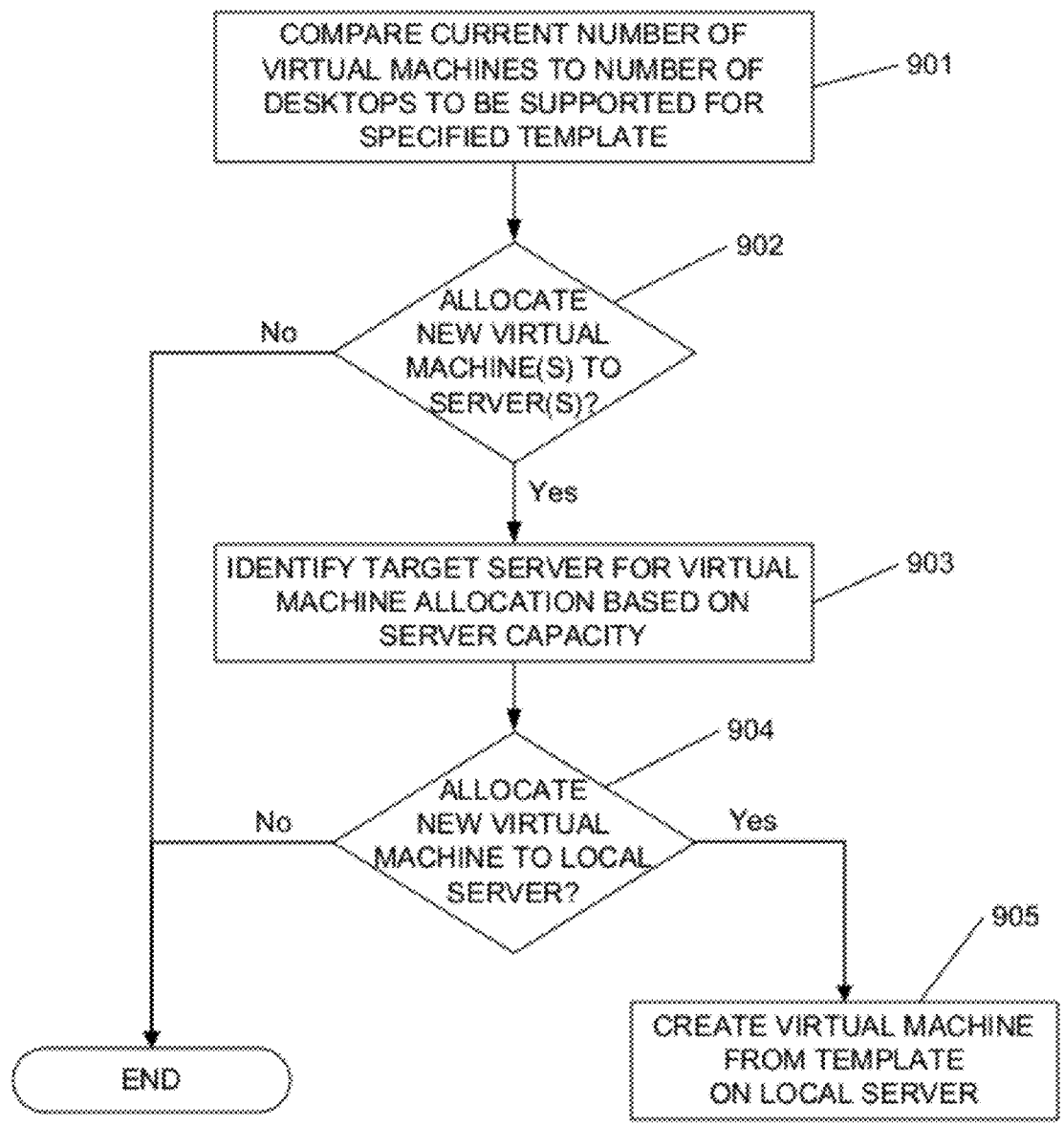

FIG. 9 is a flow diagram illustrating a method of performing dynamic load balancing on a desktop virtualization server in accordance with one or more illustrative aspects described herein.

Figure 10:
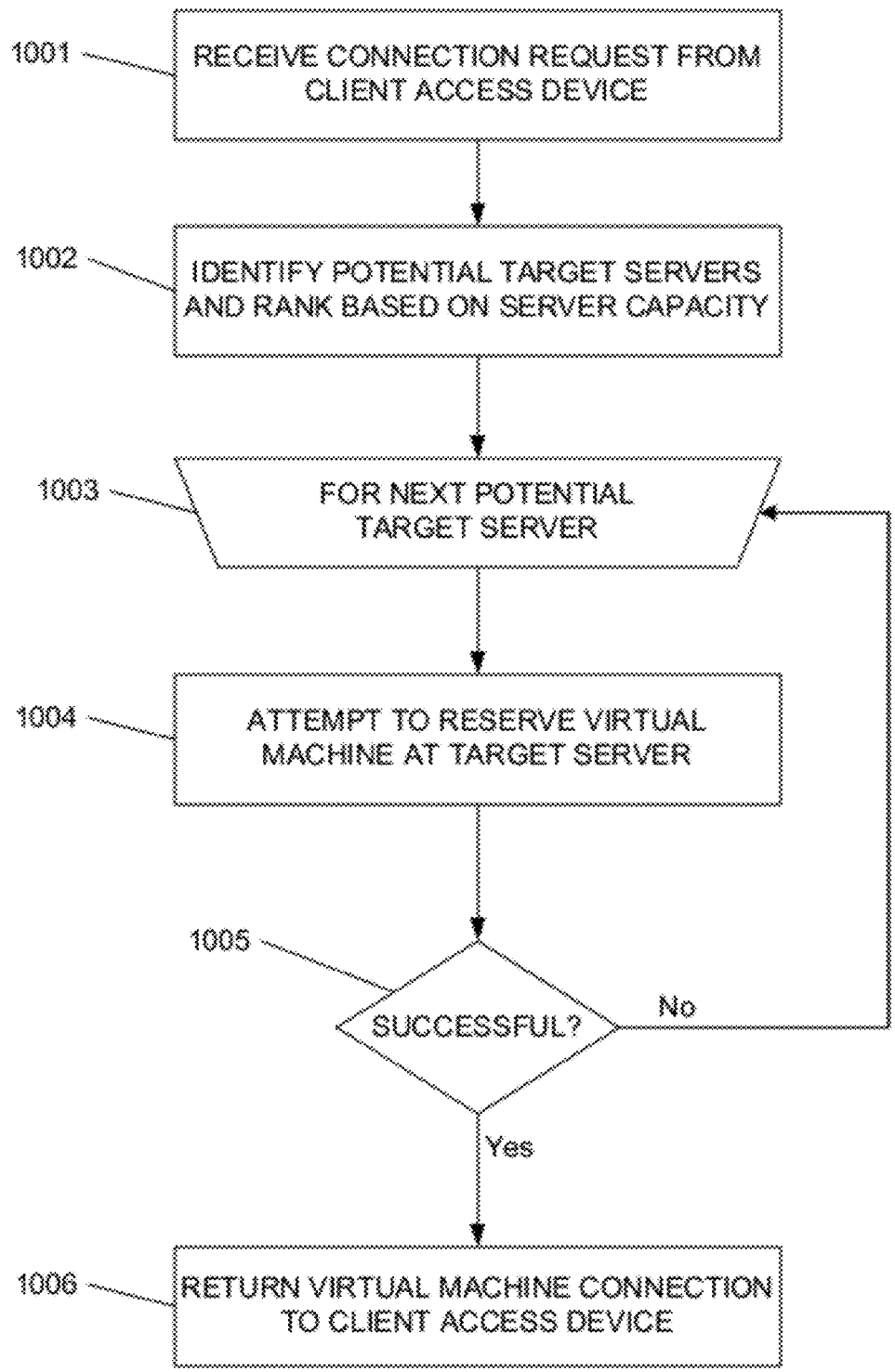

FIG. 10 is a flow diagram illustrating a method of performing connection load balancing on a desktop virtualization server in accordance with one or more illustrative aspects described herein.

Figure 11:
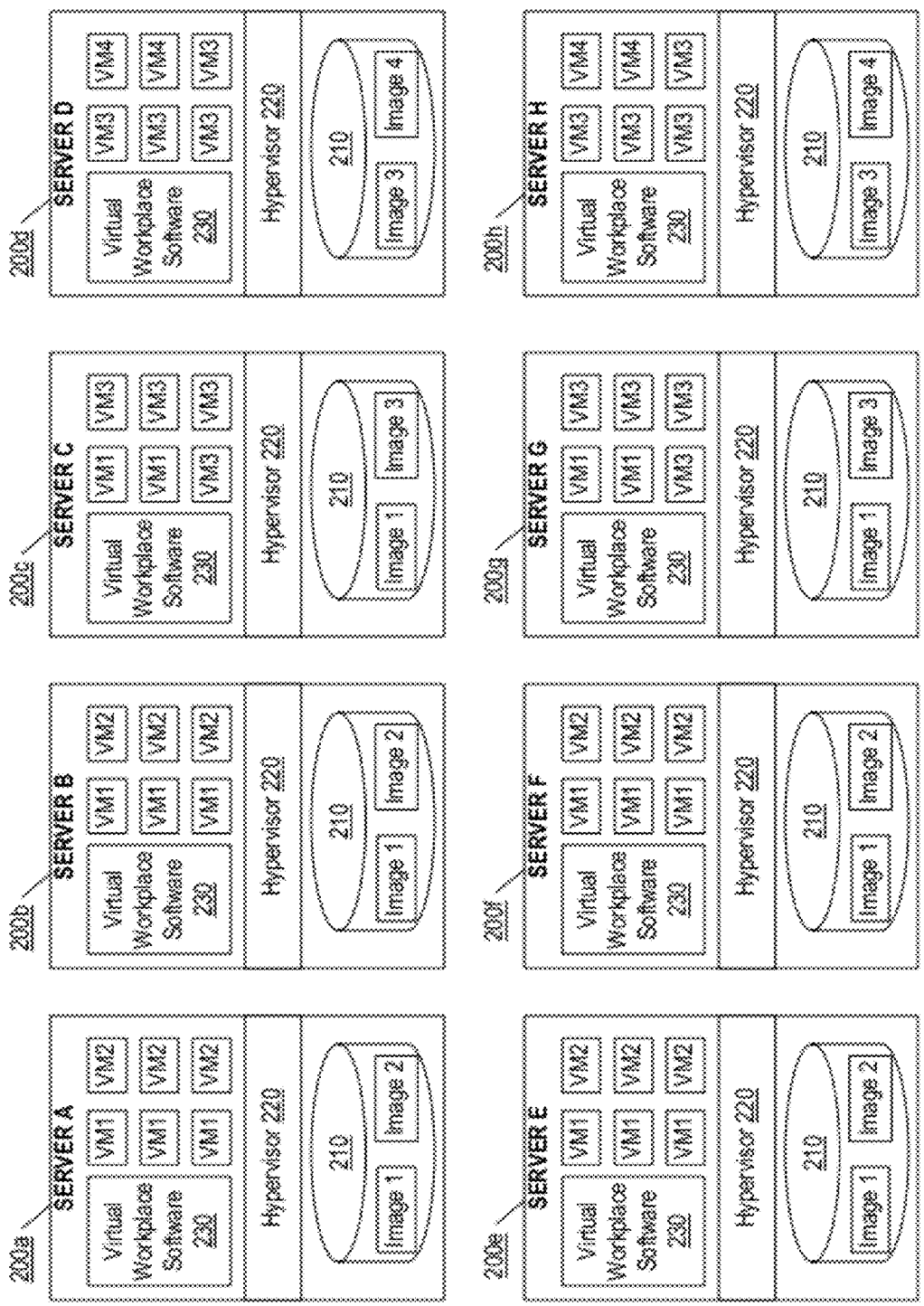

FIG. 11 is a component diagram illustrating a number of servers in a multi-server desktop virtualization system in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server) in an example computing environment 100 that may be used according to one or more illustrative embodiments of the disclosure. According to one or more aspects, generic computing device 101 may be a server in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140. The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Referring to FIG. 2, a diagram is shown illustrating a high-level architecture of an illustrative desktop virtualization system. In this example, the desktop virtualization system may be single-server or multi-server system, including at least one server 200 (e.g., a VDI server) configured to provide virtual desktops to one or more client access devices 300. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In this example, the server 200 includes a processor 205 and memory 210, and also may include one or more of the features of the general computing device 101 discussed above. The server 200 also includes a hypervisor 220 capable of creating and managing virtual machines 240 on the server 200. The hypervisor 220 is a software layer that may execute directly on the hardware of the server 200, or may execute within the operating system of the server 200. Although only one hypervisor 220 is shown in this example, servers in desktop virtualization systems may include multiple different hypervisors 220, each supporting its own set of virtual machines 240.

The server 200 in this example further includes virtual workplace software 230. The virtual workplace software 230 may include one or more software components having the functionality to control the hypervisor 220, create and manage virtual machines 240, and to enable authorized access to the virtual machines 240 by end users at client access devices 300. As shown in this example, the virtual workplace software 230 may execute on the hypervisor 220 within server 200. For example, the virtual workplace software 230 may run as a virtual machine on the hypervisor 220 that it manages. In other examples, virtual workplace software 230 may execute as an application on a separate machine different from the server 200, and may communicate with the hypervisor 220 via a network protocol.

Each virtual machine 240 created and/or managed by the virtual workplace software 230 may support one or more virtual desktops for users at client devices 300. As described in more detail below, clients 300 may connect to a virtual machine 240 over a network (e.g., the Internet 130) to initiate a virtual desktop for a user at the client device 300 (e.g., thin client, laptop, tablet, mobile device, etc.). For example, users may use web browser software to access a web-based console provided by the virtual workplace software 230. In other examples, a graphical user interference client application may be installed on the client devices 300 which is designed to connect to and communicate with the virtual workplace software 230. When a user at client device 300 attempts to access the virtual workplace software 230 to initiate a virtual desktop session, or to perform any of the management or administrative functions of the desktop virtualization system, the virtual workplace software 230 may authenticate the user to confirm that the user has the proper authority to perform the functions requested by the user. After the user has been authenticated, the virtual workplace software 230 may select a virtual machine 240 for the user's virtual desktop session and provide the user with the Internet Protocol (IP) address of the selected virtual machine 240 and/or may connect the user's access device 300 to the remote desktop protocol client running on the virtual machine 240.

The virtual workplace software 230 also may provide a graphical user interface through which administrators can manage the desktop virtualization system and/or an application programming interface (API) that may be accessed by other programs to perform management functions for the desktop virtualization system.

The virtual workplace software 230 may control the hypervisor 220 to create the virtual machines 240 running the virtual desktops for clients 300. Each virtual machine 240 may be created from a virtual machine template that identifies one or more virtual machine characteristics, for example, the operating system the virtual machine 240 may run, a set of applications the virtual machine 240 may contain, amounts of the CPU and RAM resources of the server 200 that the virtual machine 240 is permitted to consume, and other such characteristics that may be required to create and run virtual machines 240. Base images corresponding to templates may be stored in the memory 210 of servers 200, including a collection of files needed to implement a virtual machine of the template type. A virtual machine base image may include, for example, the operating system files and preinstalled programs for virtual desktops using that template. The collection of files in a base image may be relatively large (e.g., several gigabytes in size), and thus there may be significant costs for storing and transferring base images between system servers 200. Authorized administrators may create different types of virtual machine templates via the virtual workplace software 230. Administrators also may specify valid and/or invalid users, and assign users and groups of users to different templates using the virtual workplace software 230.

Referring now to FIG. 3, a functional component diagram is shown for an example virtual workplace software component 230. In this example, the virtual workplace software 230 may be one or more software components configured to provide out-of-the-box support for desktop virtualization systems. Thus, the virtual workplace software component(s) 230 may perform a wide variety of desktop virtualization functions, for example, managing the hypervisor, creating and terminating virtual machines, and setting-up connections between the virtual machines and users.

In this example, the virtual workplace software 230 includes an actualization engine 310 configured to communicate with the hypervisor 220 and memory/storage system 210 of the server 200. The actualization engine 310 may use an API published by the hypervisor to create, start, clone, modify, shutdown, and delete virtual machines 240. The actualization engine 310 may also provide the media access control (MAC) addresses, virtual networks, storage and other resources required by the virtual machines 240. Additionally, the actualization engine 310 may provide one or more APIs, which may be used by the state engine 320 or other components, to allow these components to manage the data storage of the desktop virtualization system (e.g., request and modify various storage sizes, remaining capacities, etc.), and to write and retrieve data from the storage system 210. Through these APIs and/or additional programming techniques, the actualization engine 310 may provide a layer of abstraction to the hypervisor 220, allowing the virtual workplace software 230 to run successfully on different types of hypervisors 220.

The virtual workplace software 230 in this example includes a state engine 320. The state engine 320 may store a comprehensive view of the state of the desktop virtualization on the server 200, for example, data corresponding to all virtual machines 240 and their states, a list of the virtual machine templates (or base images) stored on the server 200, along with the associated users and groups for each template, and policy and configuration information required to manage the templates, users, and virtual desktops. The state engine may also maintain current virtual desktop session information such as a list of the users/clients 300 that are currently logged in, the virtual machines 240 the each user is logged into, how long each user has been logged in, and other state information needed to manage user sessions and to recover from session failures. The data maintained by the state engine 320 may persist across a reboot of the virtual workplace software 230 and/or server 200, and the state engine may use an API provided by the actuator 310 to persist its state information to the storage system 210.

A policy engine 330 also may be included in the virtual workplace software 230. The policy engine (or director) component 330, may include the software logic for orchestrating multi-step activities or asynchronous activities performed by the desktop virtualization system. For example, the policy engine 330 may coordinate and control the creating and/or deleting of multiple virtual machines 240. The policy engine 330 also may control creation, deletion, and re-generation of virtual machines 240 from their virtual machine base images.

In this example, the virtual workplace software 230 includes a desktop service 340 configured to communicate with a desktop agent software component 350 running on each virtual machine 240. The desktop service 340 may send/receive messages from each of its associated desktop agents 350, and then leverage the policy engine 330, state engine 320, and actuation engine 310 to manage virtual machines 240, virtual machine templates, and user associations, etc.

The desktop service 340 may also provide a connection broker that accepts login credentials from users at client devices 300 (e.g., via a web server or other client-server configuration), and then creates and/or assigns virtual machines 240 to authorized users, and provides management consoles to authorized administrators.

A desktop agent software component 350, which may execute on some or all of the virtual machines 240 in the virtualization system, may monitor the health and status of its virtual machine 240 and provide the relevant information to the virtual workplace software 230. For example, each desktop agent 350 may send a periodic message to the desktop service 340 to confirm that the virtual machine 240 is still operating. The desktop agent 350 also may send a message to the desktop service 340 whenever a user logs in or out of its virtual machine 240, including the name of the user.

Additionally, in this example, the virtual workplace software 230 includes a federation engine 360 configured to communicate with one or more additional servers 200 in a multi-server desktop virtualization system. As described below, servers 200 in a multi-server desktop virtualization system may communicate with one another to transfer state information, virtual machine base images, and client connection requests between servers. For example, each server 200 in a multi-server system may periodically transfer state information to the other servers in the system describing which virtual machines' base images it is currently storing, what virtual machine images it currently has allocated, and its current capacities (e.g., number of virtual desktops hosting, number of virtual machine images, available memory and processing power, etc.). Thus, the federation engine 360 may be used by the state engine 320 to send and receive state updates to other servers 200 in order to maintain global state information for the system.

Referring now to FIG. 4, a high-level architecture diagram is shown for an illustrative multi-server desktop virtualization system. In this example, the system includes a set of at least three desktop virtualization servers 200. The servers 200 may be configured similarly with identical hardware 205-210 and/or an identical hypervisor 220. In other examples, the servers 200 may include a variety of different hardware/software configurations. The various servers 200 may communicate and coordinate operation with one another as a server grid to provide the back-end functionality of the desktop virtualization system. The servers 200 may be closely located, for example, in a commonly managed server cluster, and may communicate over a LAN or other high-speed communication network 130. In other examples, one or more of the servers 200 may be remotely located, and the communication network 130 may include a WAN (e.g., the Internet) and/or other remote networks.

In this example, the federation engines 360 of the multiple servers 200 may communicate with one another through the same network 130 used to communicate with the client access devices 300. In other examples, the servers 200 may use different networks and/or combinations of networks to communicate with other servers 200 and client devices 300.

The virtual workplace software 230 in each server may communicate via its respective federation engine 360 to maintain a global (or system-wide) common information state. That is, each server 200 may receive and store data in its memory 210 corresponding to state of one or more other servers 200 in the system, for example, the list of virtual machine base images stored in the other servers 200, the virtual machine images currently allocated in the other servers 200, and the current capacities of the other servers 200.

Each virtual workplace software 230 may execute the same (or similar) set of algorithms on their locally stored common state information, so that each server 200 may independently determine and execute a course of action based on the global system state, thereby allowing the servers to the coordinate actions with distributed algorithms. For example, a distributed static load balancing algorithm may be run by the virtual workplace software 230 of each server 200 to determine which virtual machine base images should be stored on which servers 200, and to implement the distribution by transferring base images between servers as needed. Thus, by replicating virtual machine base images from the memory 210 of one server 200 to the memory of one or more other servers, virtual machines 240 running on different servers may behave as though they are running on the same base image. Additionally, a distributed dynamic load balancing algorithm may be run by each server's virtual workplace software 230 to determine a desired distribution of virtual machine images 240 on the servers 200. A distributed connection load balancing algorithm may be run by each server's virtual workplace software 230 to route connections from client devices 300 to virtual machines 240 at selected servers 200.

By storing the global common state information for the desktop virtualization system locally at each server 200, each server may provide administrators with a single coherent view and/or management functions for the system (e.g., a management console), so that authorized administrators can seamlessly manage the system (e.g., users, virtual machines, base images, etc.) without needing to retrieve additional state information from each server 200 in the system.

Having described in FIGS. 1-4 various examples of desktop virtualization systems, and certain software and functionality that may be included in servers 200 of such systems, the following paragraphs provide additional examples of various methods and systems relating to load balancing in a multi-server virtual workplace environment (e.g., multi-server desktop virtualization system). In FIGS. 5-11, various methods and systems are described for performing load balancing using virtual workplace software 230 (e.g., desktop virtualization software) in a server 200. For example, the virtual workplace software 230 may perform static load balancing to distribute virtual machine base images among the servers 200 in the system (see, e.g., FIG. 6), dynamic load balancing to distribute allocations of virtual machines among the servers 200 (see, e.g., FIG. 9), and/or connection load balancing to distribute the hosting of virtual desktops for client devices 300 among the servers 200 (see, e.g., FIG. 10).

Thus, the virtual workplace software 230 of a server 200 may perform each of the static, dynamic, and connection load balancing functions while other servers 200 perform the same (or similar) functions, so that system-wide load balancing decisions are determined and implementing locally. However, it should be understood that not every desktop virtualization server 200 in a system must execute all of the same load balancing functions in all cases. For example, certain load balancing functions may be executed by a subset of servers 200 in a desktop virtualization system, while other load balancing functions are executed by other servers.

Referring now to FIG. 5, a flow diagram is shown illustrating a method of performing static and/or dynamic load balancing on a server in a desktop virtualization system. In step 501, new or updated state information may be received via a management console at a server 200 in a multi-server desktop virtualization system. A management console may be any interface enabling an authorized user to perform a management or administrative task on the server 200, or access or update the common state information of the desktop virtualization system. For example, the virtual workplace software 230 of a server 200 may provide a web-based management console that can be remotely accessed by users via web browser software. In other examples, a graphical user interference (GUI) of a standalone client application, installed locally on the server 200 or on client devices 300, may allow users to connect to and communicate with the virtual workplace software 230 to perform management functions or access/update the state information of the desktop virtualization system.

The virtual workplace server 200 may receive a login request, for example, from a client access device 300. The login request may include the user's authentication credentials (e.g., username and password), so that the virtual workplace server 200 may authenticate the login request to determine the user's identity and confirm that the user is an authorized administrator within the desktop virtualization system. For example, the virtual workplace server 200 may provide a secure and/or encrypted web page with a login window within a web-based application, or may use other secure authentication techniques, to request and receive the user's authentication credentials. The virtual workplace server 200 also may retrieve a set of user permissions and/or security credentials associated with user, for example, a user account or user profile, access control lists (ACL) for the user and/or user groups associated with the user, or other security/permissions information, to determine if the user is an authorized administrator.

After logging in to the management console at the virtual workplace server 200, an authorized administrator may be provided with a user interface of the management console to allow the administrator to perform the various management/administrative functions for the desktop virtualization system. Through a management console, administrators may be permitted to manage virtual machine templates (e.g., create new templates, edit or remove existing templates on the system), manage virtual machine allocations and images (e.g., specify the number of servers that should support various templates, specify the number of virtual machines to be allocated for various templates, etc.), manage users (e.g., create and remove users, edit user permissions and groups, authorize users to initiate virtual desktop sessions for various virtual machine templates, etc.), and perform other system management and administrative tasks.

In step 502, the server 200 may transmit the updated state information to one or more other servers in the desktop virtualization system. For example, if an administrator has recently created a new virtual machine template via a management console in step 501, then in step 502 the server 200 may send a message to the other servers including a definition of the new virtual machine template. Similarly, if an administrator has recently changed the desired allocation of virtual machines for a template (e.g., requested more or less virtual machines on the system), or change a user's permissions (e.g., authorized or de-authorized users from accessing virtual desktops of a template), then the server 200 may inform the other servers 200 of the updated virtual machine allocations or changed user permissions.

Referring now to step 503, new or updated state information also may be received from another server 200 in the system. For example, if an administrator has recently performs management functions (as described above in step 501) via a management console provided by another system server 200, the other server may transmit the updated state information to the local server 200. Thus, the updated state information received in step 503 may include similar state information described above in steps 501-502.

The state information received in step 503 may be an update of one or more pieces of system information, or may be a complete set of the global state information for the desktop virtualization system. For example, if the server 200 is a newly added server to the system, or is reconnecting after being offline a period of time, then the server 200 may request and receive a data transfer containing the complete global state information for the system.

In step 504, the updated state information received via the management console (step 501) or received from another server (step 503) may be stored locally by the server 200, for example, in a global state information data structure in the memory 210 of the server.

In step 505, the server 200 analyzes the updated state information in comparison to the previous state information and/or one or more additional factors, and in step 506, the server 200 determines whether or not to perform a load balancing function based on the analysis in step 505. For example, a static load balancing function may change the distribution of virtual machine templates (i.e., the storing of virtual machine base images) on the various servers 200 in the system, and a dynamic load balancing function may change the distribution of virtual machines on the various servers 200 in the system. By performing static and dynamic load balancing, a desired distribution of base images and virtual machines among the system servers may potentially allow for improved hosting of virtual desktops for client devices and more efficient operation of the desktop virtualization system.

When determining a desired distribution of base images and/or virtual machines among the system servers 200, the load balancing algorithms may consider various factors, such as the number of the servers in the system, the capacity (e.g., available memory and/or available processing power) of the servers in the system, the number of virtual machine templates supported by the system, the size of their corresponding base images, the number of virtual machines of each base image to be supported by the system, the numbers of virtual machines of each base image currently allocated at each server, and the numbers of users authorized to initiate virtual desktop sessions for each virtual machine template, among other factors. Therefore, if it is determined in step 505 that the received updated state information includes a change to any of these factors, then in step 506 a static and/or dynamic load balancing function may be performed (506:Yes). However, if it is determined in step 505 that the received updated state information is unrelated to these factors, the in step 506 the server 200 might not perform a static and/or dynamic load balancing function (506:No). As an example, if the updated state information received in step 503 indicates that a server has been removed from the system, then the analysis in step 505 may lead to a determination that one or more load balancing functions may be performed (506:Yes) in order to redistribute the base images and virtual machines that were allocated on the removed server. In contrast, if the updated state information received in step 503 indicates that only a property of a template has been changed, then the analysis in step 505 may lead to a determination that load balancing functions need not be performed (506:No).

In certain embodiments, the analysis of the updated state information in step 505 and the determination of whether or not to perform a load balancing function in step 506 may involve comparisons of the updated state information to predetermined thresholds. For example, if an administrator indicates via a management console that the system should allocate one additional virtual machine for a certain template, then the determination in step 506 may be that no static load balancing function needs to be performed because the one additional virtual machine may be allocated on a server 200 already storing the base image for the template. However, if updated state information is received that fifty additional virtual machines should be allocated for a certain template, then the determination in step 506 may be that a static load balancing function should be performed in order to transfer the base image for the template to one or more additional servers to share the resources needed to allocate the new virtual machines. As another example, if a single new user is added to the system and given permissions to instantiate virtual desktop sessions for a certain template, then the determination in step 506 may be that a dynamic load balancing function need not be performed because the existing virtual machine allocations can support the single additional user. However, if many new users are given permissions to instantiate virtual desktop sessions for the template, then the determination in step 506 may be that a dynamic load balancing function may be performed in order to allocate a number of additional virtual machines for the template within the system.

In step 507, if a determination is made to perform one or more static or dynamic load balancing functions (506:Yes), then the server 200 may invoke the determined functions to execute one or more load balancing algorithms. Examples of static, dynamic, and connection load balancing functions and algorithms are described below with respect to FIGS. 6, 9, and 10, respectively. As discussed above, the same (or similar) analysis in step 505 may be performed independently by the virtual workplace software 230 of each server 200 in the system. Moreover, because each server 200 may locally maintain identical (or similar) global state information for the system, then each server may reach the same determination in step 506 regarding which static and dynamic load balancing functions/algorithms to invoke. Thus, by invoking the same set of load balancing functions, the servers 200 within the desktop virtualization system may independently determine and execute a coordinated course of action for load balancing within the global system state.

Referring now to FIG. 6, a flow diagram is shown illustrating a method of performing static load balancing in a multi-server desktop virtualization system. Static load balancing refers to managing the distribution and storage of different virtual machine base images on the various servers 200 in the system. During static load balancing, different virtual machine base images may be transferred to and from various servers 200 in the system. Specifically, the algorithm shown in FIG. 6 may determine whether a specific base image should be added to the current server 200. As discussed above, the algorithm in this example, along with other load balancing functions, may be independently executed by multiple desktop virtualization servers 200 in order to coordinate load balancing across the system.

In step 601, for a virtual machine base image in the desktop virtualization system, the server 200 may determine whether the base image is stored on a single server or on multiple servers in the system. In this example, the system may implement a policy in which every virtual machine base image should be stored on at least two servers 200 in the system to provide redundancy and protect against a server failure. Therefore, if the base image is stored only on a single server 200 (601:Yes), then a determination is made that an additional base image should be added to at least one server 200 in the system, and the process proceeds to step 604 to identify the server(s) 200 on which to add the base image.

In this example, if the base image is already stored on multiple servers in the desktop virtualization system (601: No), then the server 200 analyzes the global state information relating to the base image in step 602. For example, the server 200 may retrieve and analyze locally stored common state information for the system, such as the number of servers in the system currently storing the base image and the capacities of those servers, the number and capacities of servers in the system not storing the base image, and the number of virtual machines to be allocated across the system using the base image.

From the analysis in step 602, the server 200 may determine in step 603 whether or not the base image should be added to one or more additional servers in the system. For example, if the number of virtual machines to be allocated for the base image has recently increased by more than a predetermined threshold, or if an existing server storing the base image has recently been taken off line, then the server 200 may determine that the base image should be transferred to at least one additional server in the system (603:Yes). In contrast, if the number of virtual machines to be allocated using the base image has not been increased by more than a predetermined threshold, or if the existing servers storing the base image have ample capacity to support additional virtual machines, then the server 200 may determine that the base image should not be transferred to any additional servers at this time (603:No).

In step 604, after determining that the base image should be transferred to at least one additional server (603:Yes), the server 200 performs a ranking algorithm to identify the target server(s) on which the base image should be added. To perform this determination, the server 200 may identify the subset of system servers that do not currently contain the base image, and then rank the subset based on their current and/or expected future capacities (e.g., memory and processing power). Other factors may be considered as well, for example, the varying costs of transferring the base image to different servers, and/or the physical location of the servers in comparison to the client devices 300 that are likely to initiate virtual desktop sessions on the virtual machines 240 of the base image.

In step 605, using the list of one or more target servers identified in step 604, the server 200 determines whether or not the base image should be added to its own local memory 210. That is, the server 200 may review the list of target servers to determine if it is on the list. If so (605:Yes), the server 200 may transfer the base image to its local memory 210 in step 606, for example, by locating another server in the system that contains the base image and requesting a transfer of the base image from the other server. If the server 200 is not on the target server list identified in step 604 (605:No), then the server 200 need not transfer the base image into its local memory 210.

As discussed above, the algorithm in this example may be executed independently by multiple servers 200 in the desktop virtualization system. Each server 200 may perform the same (or similar) analysis on the same (or similar) global state information, and thus may identify the same list of one or more target servers in step 604. Therefore, when each server independently performs the determination in step 605 of whether or not the base image should be added to its local memory 210, the determination will be affirmative when executed by a target server 200, and negative when executed by a non-target server 200. As a result, the independently executed algorithm will coordinate the static load balancing across the system, by causing only the identified target servers to request and store the base image.

In certain examples, the algorithm shown in FIG. 6 may be executed once to determine that a base image should be added to a set of multiple servers 200. In other examples, the algorithm of FIG. 6 may be executed iteratively, identifying a single server 200 in each iteration, until an iteration of the algorithm determines that no additional servers 200 should add the base image. Additionally, although the algorithm in FIG. 6 only describes adding a virtual machine base image to one or more servers 200 in a desktop virtualization system, corresponding functions and algorithms may be used to remove base images from servers, and to redistribute the system by moving base images from one server to another.

Referring now to FIG. 7, an illustrative diagram is shown for transferring a virtual machine base image between two servers 200 in a multi-server desktop virtualization system. In this example, virtualization server 200b may request a base image 710 from virtualization server 200a after executing the algorithm in FIG. 6 and determining the base image 710 should be stored by server 200b. As discussed above, the base image 710 may include, for example, the operating system files and preinstalled programs for virtual desktops using that base image. After receiving a request from the virtual workplace software 230b on virtualization server 200b for the base image 710, the virtual workplace software 230a on virtualization server 200a may transfer the entire collection of files for the base image 710a from its local memory 210a to the memory 210b of the requesting server 200b. The virtualization server 200a may also reconstruct one or more ancillary descriptor files and/or may customize the files of the base image so the base image 710b will operate correctly on the recipient server 200b.

In certain embodiments, if permitted by the underlying hypervisors 220, the base image 710a may be transferred from the memory 210a of the first server 200a directly to the memory 210b of the second server 200b. In other examples, if a hypervisor does not permit a direct transfer of the base image files from between the servers' disks, then the virtual workplace software 230a may stage the transfer (as shown in FIG. 7) by first exporting the collection of base image files to a file system writable by the software 230, and then importing the base image files, with customization, onto the memory 210b of the destination server 200b.

Referring now to FIG. 8, another illustrative diagram is shown for transferring a virtual machine base image between two servers 200 in a multi-server desktop virtualization system. In this example, an image difference 815a is used to mitigate the expensive transfer of larger base images. The image difference 815a is a file, that when applied to the current base image 810a, results in the new base image 820a. The image difference 815a may work similarly on multiple servers 200a-200b. Thus the virtual workplace software 230 on the target server 200b may construct a new image 820b from the old base image 810b using the different 815b received from the first server 200a.

Further, in this example, the base image difference 815a between the base image 810a and the new image 820a may be a difference disk generated by the hypervisor 220 to store the written disk portions of a base image 810a as distinguished from the read-only mass found in the base image 810a. The hypervisor 220 may permit this capability and may offer mechanisms to flatten the difference 815a into the old base image 810a to generate a new base image 820a. In other examples, the difference 815a may be computed by a binary difference and patching application, and flattened at the destination server 200b using a similar application.

Referring now to FIG. 9, a flow diagram is shown illustrating a method of performing dynamic load balancing in a multi-server desktop virtualization system. Dynamic load balancing refers to the process of managing the distribution of virtual machines (or virtual machine images) on the various servers 200 in the system. During dynamic load balancing, virtual machine images may be created for templates using base images on the various servers 200 in the system. Specifically, the function shown in FIG. 9 performs an algorithm determining whether a virtual machine image 240 corresponding to specific template/base image should be added to the current server 200. As discussed above, the algorithm in this example, along with other load balancing functions, may be independently executed by multiple desktop virtualization servers 200 in order to coordinate load balancing across the system.

In step 901, a server 200 in a desktop virtualization system compares the number of virtual machines 240 that are currently allocated in the system for a specified template to a determination of the desired number of virtual desktops for that template that should be supported by the system. The current number of allocated virtual machines 240 for the template may be retrieved by the server 200 from the global state information stored locally in the server's memory 210. The desired number of virtual desktops 240 to be supported for a specific template may be set by an administrator via a management console, or may be calculated based on the numbers and types of users authorized to initiate virtual desktop sessions for that template. Such calculations may be based on additional factors, such as the past usage data of virtual machines 240 of the template and estimates of future usage (e.g., estimated numbers of sessions, length of sessions, etc.) of virtual desktop sessions for the template.

From the analysis and comparison in step 901, the server 200 may determine in step 902 whether or not one or more new virtual machines 240 for the template should be allocated within the system. For example, if an administrator has recently increased the number of desired virtual machines to be allocated for a current template, and if the system servers have the capacity to support the desired virtual machines 240, then the server 200 may determine that the additional number of virtual machines should be allocated in the system (902: Yes). In contrast, if the number of users authorized to initiate virtual desktop sessions for the template has not been increased by more than a predetermined threshold, and/or if the current allocation of virtual machines 240 for the template are sufficient to support the estimated number of virtual desktop sessions, then the server 200 may determine that the no additional virtual machines 240 should be allocated for the template at this time (902:No).

In step 903, after determining that one or more additional virtual machines 240 should be allocated in the system (902: Yes), the server 200 performs a ranking algorithm to identify the target server(s) that should allocate the additional virtual machines 240. To perform this determination, the server 200 may identify the subset of system servers that currently contain the base image for the virtual machine template, and then rank the subset based on their current and/or expected future capacities (e.g., memory and processing power). Other factors may be considered as well, for example, the physical location of the various servers 200 in comparison to the client devices 300 that are likely to initiate virtual desktops sessions for the template.

In step 904, using the list of one or more target servers identified in step 903, the server 200 determines whether or not it should allocate one or more of the new virtual machines 240 for the system. That is, the server 200 may review the list of target servers to determine if it is on the list. If so (904:Yes), the server 200 may allocate a new virtual machine 240 in step 905, using the base image of the template stored in its local memory 210. If the server 200 is not on the target server list identified in step 903 (904:No), then the server 200 need not allocate a new virtual machine 240.

As discussed above, the algorithm in this example may be executed independently by multiple servers 200 in the desktop virtualization system. Each server 200 may perform the same (or similar) analysis on the same (or similar) global state information, and thus may identify the same list of one or more target servers in step 903. Therefore, when each server independently performs the determination in step 904 of whether or not it should allocate new virtual machines 240 for the template, the determination will be affirmative when executed by a target server 200, and negative when executed by a non-target server 200. As a result, the independently executed algorithm will coordinate the dynamic load balancing across the system, by causing only the identified target servers to allocate new virtual machines 240 for the template.

In certain examples, the algorithm shown in FIG. 9 may be executed once to determine a set of target servers 200 on which to allocate new virtual machines 240 and/or the number of virtual machines 240 that each target server should allocate. For instance, multiple target servers may be identified in the analysis and/or ranking in step 903, and the algorithm may determine that a first target server should allocate more virtual machines than a second target server (e.g., based on the server capacities, etc.). In other examples, the algorithm of FIG. 9 may be executed iteratively, instructing a single target server 200 to allocate a single virtual machine in each iteration, so that previous virtual machine allocations may be accounted for in subsequent iterations of the algorithm. Additionally, although the algorithm in FIG. 9 only describes allocating a new virtual machine to one or more servers 200 in a desktop virtualization system, corresponding functions/algorithms may be used to de-allocate (i.e., destroy) virtual machines from servers, and to distribute virtual machine allocations among the system servers.

Referring now to FIG. 10, a flow diagram is shown illustrating a method of performing connection load balancing in a multi-server desktop virtualization system. Connection load balancing refers to the process of managing the distribution of virtual desktop sessions on the various servers 200 in the system.

In step 1001, a server 200 receives a virtual desktop login request from a client device 300. For example, users may use web browser software to access a web-based login console provided by the virtual workplace software 230. In other examples, a client application may be installed on the client devices 300 designed to connect to and communicate with the virtual workplace software 230. When a user at client device 300 attempts to access the virtual workplace software 230 to initiate a virtual desktop session, the virtual workplace software 230 may authenticate the user's credentials (e.g., username and password), so that the server 200 may determine the user's identity and confirm that the user is authorized to initiate virtual desktop sessions for one or more virtual machine templates on the system.

If the user is authorized to initiate virtual desktop sessions for more than one template (e.g., PC-based or MAC-based virtual desktops, different virtual desktops with business applications for different specific user roles, etc.), then the server 200 may first determine a template for the requested virtual desktop session before selecting the virtual machine 240 and server 200 to host the desktop. In some examples, specific virtual machine templates may be associated with certain types of logins, for instance, designated uniform resource locators (URLs) or standalone client applications. In other examples, a user may first login to the server 200 and then request a virtual desktop template (e.g., PC or MAC desktop).

In step 1002, after the user is authenticated for a virtual desktop based on a specific template, the server 200 may identify and rank potential target servers to host the virtual desktop session. To identify and rank potential target servers, the server 200 may retrieve the global state information from its local storage 210 and assemble a list of the servers in the system that currently store the base image for the template of the requested virtual desktop. Then, the server 200 may perform a ranking algorithm to generate a preferred ordered list of target servers for hosting the virtual desktop. To rank the potential target servers in the system, the server 200 may retrieve and analyze the current and/or expected future capacities (e.g., memory and processing power) of each server in the list. Other factors may be considered as well, for example, the number of available (i.e., unreserved) virtual machines at the server, and/or the physical or geographic location of the server in comparison to the virtual desktop client device 300.

In step 1003, the server 200 begins an iterative function on the ordered list of potential target servers for hosting the virtual desktop. For the first potential target server, the requesting server 200 will attempt to reserve a virtual machine for the template at the target server in step 1004. To reserve a virtual machine 240, the requesting server 200 may send a request and receive a response via the virtual workplace software 230 of the both servers. If a virtual machine 240 at the first potential target server is successfully reserved (1005:Yes), then the requesting server 200 may end the iterative function and return the virtual machine connection information (e.g., an IP address for the target server) to the requesting client device 300 in step 1006. However, if the attempt to reserve a virtual server 240 at the target server is unsuccessful, for example, if the target server does not respond to the request, or responds that it has no available virtual machines (1005:No), then the requesting server 200 may continue its iterative function at step 1003 with the next potential target server in the list. Additionally, if a target server is unresponsive during the attempted communication in step 1004, the requesting server 200 may update the global state information for the system to mark the target server as unavailable.

Referring now to FIG. 11, a diagram is shown illustrating storage of base images and the allocation of virtual machines using the base images, on an example desktop virtualization system containing multiple servers. In this example, the desktop virtualization system contains servers 200a-200h, each of which contains two base images in its memory 210 and a corresponding set of virtual machines for each base image. The distribution of base images and allocation of virtual machines shown in this example desktop virtualization system may be the result of executing a series of static and dynamic load balancing algorithms, such as those described above in FIGS. 6 and 9.

As shown in FIG. 11, static and dynamic load balancing functions may result in an asymmetric distribution of base images across the servers 200a-200h in the desktop virtualization system, and each base image might only be stored on a subset of the servers. In this example, base image 1 is stored on six servers in the grid, and there are sixteen virtual machine images based on base image 1 distributed among the system servers. Base image 2 is stored on four servers and has twelve corresponding virtual machine images in the system, and so on.

Thus, as illustrated in this example, aspects of the present disclosure may allow for a scalable and distributed virtual desktop system to be implemented either with or without an external shared storage and/or external management. In this example, the functionality to manage the desktop virtualization system, and to perform dynamic, static, and connection load balancing may be included within the virtual workplace software 230 running on top of the hypervisor 220 and/or operating system of each server 200 in the system.

Further, aspects of the present disclosure may allow for dynamic scalability of the desktop virtualization system. For example, a new server 200 may be brought into the server grid of an existing system by first installing the virtual workplace software 230 and configuring the connection between the virtual workplace software 230 and the hypervisor 220. An administrator may then identify the location of any other server in the grid to the new server 200, or vice versa. After a new server 200 has been identified as a member of the system to an existing server, the virtual workplace software 230 of the two servers may automatically join the new server 200 into the server grid by authenticating the new server 200, updating and joining the new server's state with the global state information for the rest of the system, and transferring any needed base images to the new server 200. Each of these functions may be performed by the virtual workplace software 230, rather than by the operating system or enterprise server software within the servers 200. Moreover, these functions may be performed automatically, without involvement from the administrator.

In certain examples, if a server 200 detects that another server in the system is not responding to communications, the nonresponsive server may be marked as missing in the global state information, and may thereafter be excluded from hosting virtual desktop sessions for client devices 300. In this case, the load balancing functions in the remaining servers 200 in the system may transfer base images and/or generate virtual machines to account for the nonresponsive server. At a later time, if the nonresponsive server 200 becomes responsive and is once again available to the system, this server may be joined back into the server grid automatically and may resume sharing in the system's hosting of virtual desktops.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. A method comprising:
  receiving, at a first server executing desktop virtualization software, state information for a desktop virtualization system comprising a plurality of desktop virtualization servers, said plurality of desktop virtualization servers including the first server;
  receiving, by the desktop virtualization software of the first server, a request to create one or more virtual machines in the desktop virtualization system corresponding to a first virtual machine template;
  executing, by the desktop virtualization software of the first server, a load balancing algorithm based on the desktop virtualization system state information, wherein executing the load balancing algorithm comprises:
    (a) identifying a plurality of desktop virtualization servers storing a first virtual machine base image corresponding to the first virtual machine template;
    (b) determining a load balancing action corresponding to a determination to allocate one or more new virtual machines corresponding to the first virtual machine base image in a memory of at least one desktop virtualization server in the desktop virtualization system;
    (c) identifying a current resource capacity for each of the plurality of desktop virtualization servers storing the first virtual machine base image; and
    (d) determining at least one target server corresponding to the at least one desktop virtualization server at which to allocate the one or more new virtual machines corresponding to the first virtual machine base image, wherein the determination of the at least one target server is based on the current resource capacity of the plurality of desktop virtualization servers storing the first virtual machine base image;
  determining, by the desktop virtualization software of the first server, whether the first server is the target server to perform the load balancing action; and
  based on a determination that the first server is the target server to perform the load balancing action, performing the load balancing action at the first server.

2. The method of claim 1, wherein the received state information for the desktop virtualization system comprises:
  data identifying each of the plurality of desktop virtualization servers in the desktop virtualization system;
  data identifying a current resource capacity for each of the plurality of desktop virtualization servers in the desktop virtualization system; and
  data identifying a set of virtual machine base images stored at each of the plurality of desktop virtualization servers in the desktop virtualization system.

3. The method of claim 1, further comprising:
  receiving, by the desktop virtualization software of the first server, an event indication corresponding to at least one of:
    an indication that at least one new desktop virtualization server has been added to the desktop virtualization system; and
    an indication that at least one of the plurality of desktop virtualization servers has been removed from the desktop virtualization system,
  wherein the execution of the load balancing algorithm is triggered based on receiving the event indication.

4. The method of claim 1, further comprising:
receiving, at a second server executing desktop virtualization software in the plurality of desktop virtualization servers, the state information for the desktop virtualization system;
executing, by the desktop virtualization software of the second server, the load balancing algorithm based on the desktop virtualization system state information; and
determining, by the desktop virtualization software of the second server, whether the second server is the target server to perform the load balancing action,
wherein only one of the first server and the second server is the target server to perform the load balancing action.

5. The method of claim 4, wherein the first server and the second server are not configured to communicate via a shared memory.

6. The method of claim 4, wherein the first server and the second server are remotely located and configured to communicate via a wide area network (WAN).

7. A method comprising:
receiving, at a first server executing desktop virtualization software, state information for a desktop virtualization system comprising a plurality of desktop virtualization servers, said plurality of desktop virtualization servers including the first server;
receiving, by the desktop virtualization software of the first server, a request to connect to a client device to a virtual machine in the desktop virtualization system corresponding to a first virtual machine template;
executing, by the desktop virtualization software of the first server, a load balancing algorithm based on the desktop virtualization system state information, wherein executing the load balancing algorithm comprises:
  (a) identifying a plurality of desktop virtualization servers storing a first virtual machine base image corresponding to the first virtual machine template;
  (b) determining a load balancing action corresponding to a determination to establish a connection between the client device and one of the plurality of desktop virtualization servers storing the first virtual machine base image;
  (c) identifying a current resource capacity for each of the plurality of desktop virtualization servers storing the first virtual machine base image; and
  (d) determining a target server corresponding to the desktop virtualization server to be connected to the client device, wherein the determination of the target server is based on the current resource capacity of the plurality of desktop virtualization servers storing the first virtual machine base image;
determining, by the desktop virtualization software of the first server, whether the first server is the target server to perform the load balancing action; and
based on a determination that the first server is the target server to perform the load balancing action, performing the load balancing action at the first server.

8. The method of claim 7, wherein the received state information for the desktop virtualization system comprises:
data identifying each of the plurality of desktop virtualization servers in the desktop virtualization system;
data identifying a current resource capacity for each of the plurality of desktop virtualization servers in the desktop virtualization system; and
data identifying a set of virtual machine base images stored at each of the plurality of desktop virtualization servers in the desktop virtualization system.

9. The method of claim 7, further comprising:
receiving, by the desktop virtualization software of the first server, an event indication corresponding to at least one of:
  an indication that at least one new desktop virtualization server has been added to the desktop virtualization system; and
  an indication that at least one of the plurality of desktop virtualization servers has been removed from the desktop virtualization system,
wherein the execution of the load balancing algorithm is triggered based on receiving the event indication.

10. The method of claim 7, further comprising:
receiving, at a second server executing desktop virtualization software in the plurality of desktop virtualization servers, the state information for the desktop virtualization system;
executing, by the desktop virtualization software of the second server, the load balancing algorithm based on the desktop virtualization system state information; and
determining, by the desktop virtualization software of the second server, whether the second server is the target server to perform the load balancing action,
wherein only one of the first server and the second server is the target server to perform the load balancing action.

11. The method of claim 10, wherein the first server and the second server are not configured to communicate via a shared memory.

12. The method of claim 10, wherein the first server and the second server are remotely located and configured to communicate via a wide area network (WAN).

13. A system comprising:
a first server comprising a processor controlling at least some operations of the first server, and a memory storing computer-executable instructions that, when executed by the processor, cause the first server to:
receive state information for a desktop virtualization system comprising a plurality of desktop virtualization servers, said plurality of desktop virtualization servers including the first server;
receive a request to create one or more virtual machines in the desktop virtualization system corresponding to a first virtual machine template;
execute a load balancing algorithm based on the desktop virtualization system state information, wherein executing the load balancing algorithm comprises:
  (a) identifying a plurality of desktop virtualization servers storing a first virtual machine base image corresponding to the first virtual machine template;
  (b) determining a load balancing action corresponding to a determination to allocate one or more new virtual machines corresponding to the first virtual machine base image in a memory of at least one desktop virtualization server in the desktop virtualization system;
  (c) identifying a current resource capacity for each of the plurality of desktop virtualization servers storing the first virtual machine base image; and
  (d) determining at least one target server corresponding to the at least one desktop virtualization server at which to allocate the one or more new virtual machines corresponding to the first virtual machine base image, wherein the determination of the at least one target server is based on the current resource capacity of the plurality of desktop virtualization servers storing the first virtual machine base image;

determine whether the first server is the target server to perform the load balancing action; and based on a determination that the first server is the target server to perform the load balancing action, perform the load balancing action at the first server.

14. The system of claim 13, wherein the received state information for the desktop virtualization system comprises:

data identifying each of the plurality of desktop virtualization servers in the desktop virtualization system;

data identifying a current resource capacity for each of the plurality of desktop virtualization servers in the desktop virtualization system; and data identifying a set of virtual machine base images stored at each of the plurality of desktop virtualization servers in the desktop virtualization system.

15. The system of claim 13, the memory of the first server storing further computer-executable instructions that, when executed by the processor, cause the first server to:

receive an event indication corresponding to at least one of:

an indication that at least one new desktop virtualization server has been added to the desktop virtualization system; and an indication that at least one of the plurality of desktop virtualization servers has been removed from the desktop virtualization system, wherein the execution of the load balancing algorithm is triggered based on receiving the event indication.

16. The system of claim 13, further comprising:

a second server in the plurality of desktop virtualization servers, the second server comprising a processor controlling at least some operations of the second server, and a memory storing computer-executable instructions that, when executed by the processor, cause the second server to:

receive the state information for the desktop virtualization system;

execute the load balancing algorithm based on the desktop virtualization system state information; and determine whether the second server is the target server to perform the load balancing action, wherein only one of the first server and the second server is the target server to perform the load balancing action.

17. The system of claim 16, wherein the first server and the second server are not configured to communicate via a shared memory.

18. The system of claim 16, wherein the first server and the second server are remotely located and configured to communicate via a wide area network (WAN).

19. A system comprising:

a first server comprising a processor controlling at least some operations of the first server, and a memory storing computer-executable instructions that, when executed by the processor, cause the first server to:

receive state information for a desktop virtualization system comprising a plurality of desktop virtualization servers, said plurality of desktop virtualization servers including the first server;

receive a request to connect a client device to a virtual machine in the desktop virtualization system corresponding to a first virtual machine template;

execute a load balancing algorithm based on the desktop virtualization system state information, wherein executing the load balancing algorithm comprises:

(a) identifying a plurality of desktop virtualization servers storing a first virtual machine base image corresponding to the first virtual machine template;

(b) determining a load balancing action corresponding to a determination to establish a connection between the client device and one of the plurality of desktop virtualization servers storing the first virtual machine base image;

(c) identifying a current resource capacity for each of the plurality of desktop virtualization servers storing the first virtual machine base image; and (d) determining a target server corresponding to the desktop virtualization server to be connected to the client device, wherein the determination of the target server is based on the current resource capacity of the plurality of desktop virtualization servers storing the first virtual machine base image;

determine whether the first server is the target server to perform the load balancing action; and based on a determination that the first server is the target server to perform the load balancing action, perform the load balancing action at the first server.

20. The system of claim 19, wherein the received state information for the desktop virtualization system comprises:

data identifying each of the plurality of desktop virtualization servers in the desktop virtualization system;

data identifying a current resource capacity for each of the plurality of desktop virtualization servers in the desktop virtualization system; and data identifying a set of virtual machine base images stored at each of the plurality of desktop virtualization servers in the desktop virtualization system.

21. The system of claim 19, the memory of the first server storing further computer-executable instructions that, when executed by the processor, cause the first server to:

receive an event indication corresponding to at least one of:

an indication that at least one new desktop virtualization server has been added to the desktop virtualization system; and an indication that at least one of the plurality of desktop virtualization servers has been removed from the desktop virtualization system, wherein the execution of the load balancing algorithm is triggered based on receiving the event indication.

22. The system of claim 19, further comprising:

a second server in the plurality of desktop virtualization servers, the second server comprising a processor controlling at least some operations of the second server, and a memory storing computer-executable instructions that, when executed by the processor, cause the second server to:

receive the state information for the desktop virtualization system;

execute the load balancing algorithm based on the desktop virtualization system state information; and determine whether the second server is the target server to perform the load balancing action, wherein only one of the first server and the second server is the target server to perform the load balancing action.

23. The system of claim 22, wherein the first server and the second server are not configured to communicate via a shared memory.

24. The system of claim 22, wherein the first server and the second server are remotely located and configured to communicate via a wide area network (WAN).

* * * * *